(12) United States Patent
McDonald (10) Patent No.: US 7,685,936 B2
(45) Date of Patent: Mar. 30, 2010

(54) ROOT BEER FLOAT STRAINER AND METHOD OF REDUCING FOAM

(76) Inventor: Daniel W. McDonald, 483 Harbor Ct., Shoreview, MN (US) 55126

( * ) Notice: Subject to any disclaimer, the term of this patent is extended or adjusted under 35 U.S.C. 154(b) by 704 days.

(21) Appl. No.: 11/470,016

(22) Filed: Sep. 5, 2006

(65) Prior Publication Data
US 2008/0053890 A1     Mar. 6, 2008

(51) Int. Cl.
*A23N 1/00* (2006.01)
(52) U.S. Cl. ........................................ 99/513; 62/457.3
(58) Field of Classification Search ................ 99/323.1, 99/323.2, 495, 513; 426/524; 62/457.3, 62/529
See application file for complete search history.

(56) References Cited

U.S. PATENT DOCUMENTS

| 490,902 | A | * | 1/1893 | Galbreath | 220/4.25 |
|---|---|---|---|---|---|
| 1,419,549 | A | * | 6/1922 | Fearnow | 119/203 |
| 1,745,012 | A | * | 1/1930 | Gilmore | 43/56 |
| 2,106,453 | A | * | 1/1938 | Ekdahl | 210/469 |
| 2,330,012 | A | * | 9/1943 | Schlumbohm | 210/464 |
| 2,490,379 | A | * | 12/1949 | Schlumbohm | 62/281 |
| 2,716,871 | A | * | 9/1955 | Brown | 62/293 |
| 3,354,812 | A | * | 11/1967 | Gorton, Jr. | 99/323 |
| 3,365,304 | A | * | 1/1968 | Guterman et al. | 426/101 |
| 5,085,330 | A | * | 2/1992 | Paulin | 215/6 |
| 5,158,216 | A | * | 10/1992 | Viani | 222/465.1 |
| 5,312,014 | A | * | 5/1994 | Hamlin | 220/703 |
| 5,661,924 | A | * | 9/1997 | Maxwell | 43/55 |
| 6,105,305 | A | * | 8/2000 | Edens | 43/54.1 |
| 6,112,537 | A | | 9/2000 | Broadbent | |
| 6,159,513 | A | * | 12/2000 | Judlowe et al. | 426/115 |
| 6,168,816 | B1 | * | 1/2001 | Hammond | 426/433 |
| 7,028,505 | B2 | * | 4/2006 | Cardinale | 62/372 |
| 7,077,054 | B1 | * | 7/2006 | Hurlock | 99/323 |
| 2007/0089614 | A1 | * | 4/2007 | Tremblay | 99/495 |
| 2008/0202150 | A1 | * | 8/2008 | Siordia | 62/457.3 |

OTHER PUBLICATIONS

Stainless Steel Bar Strainer by Rosle, Aug. 12, 2004, Cooking.com <http://web.archive.org/web/20041208102747/http://www.cooking.com/products/shprodde.asp?SKU=212435> <Description of a Hawthorne Strainer>.*
Hawthorn Strainer, May 12, 2004, Drinks On The Mouse, TheDrinkShop.com <http://web.archive.org/web/20041205091142/http://www.thedrinkshop.com/products/nlpdetail.php-?prodid=1746> <Image of a Hawthorne Strainer>.*

* cited by examiner

*Primary Examiner*—Tu B Hoang
*Assistant Examiner*—Hemant Mathew
(74) *Attorney, Agent, or Firm*—Merchant & Gould P.C.

(57) ABSTRACT

A strainer for use with combining beverages and cold food includes a bottom section sized for insertion into a beverage container, and a side section projecting substantially vertically from the bottom section and sized for insertion into a portion of the beverage container. At least one of the bottom and side sections is liquid permeable, and the bottom section and side section are separately or collectively capable of retaining ice pieces when the strainer is in the container. A method for retaining ice in a container capable of holding a liquid includes placing a strainer capable of retaining ice in a container capable of holding a liquid, adding ice to the container such that at least some of the ice is retained by the strainer, placing a liquid in the container, and removing the strainer from the container.

3 Claims, 10 Drawing Sheets

ROOT BEER FLOAT STRAINER AND METHOD OF REDUCING FOAM

TECHNICAL FIELD

The present disclosure relates to an improved method of making beverages commonly known as root beer floats, and similar beverages involving liquids such as carbonated beverages and foods such as ice cream.

BACKGROUND

A favorite cold and refreshing food treat for many people is known as a "float." Floats typically include a beverage, such as root beer or orange soda, and a frozen dessert, such as ice cream or frozen yogurt, placed together in a glass. The person enjoying the float may, for example, eat the ice cream with a spoon, or drink the beverage with or without a straw. For some, a float combines the refreshment of a beverage with the cool relief of a frozen dessert all in one, with a combination of flavors being superior to either individually.

However, when making floats, a problem can arise when mixing the frozen treat with a beverage. Root beer, orange soda, and other beverages, especially carbonated beverages, tend to foam up significantly when poured from a can or bottle into a glass containing ice cream or another frozen treat. Sometimes, the beverage may fill only a fraction of the glass, while the foam rises to fill and even spill over the top of the glass. This creates a mess, as the foam may spill out. It also makes it difficult to pour as much of the beverage into the glass as is desired, without taking time or effort to remove the foam or cause the foam to subside, either by waiting for the foam's bubbles to burst, or by using a utensil of some sort to reduce or remove the foam. This dirties more utensils, takes time, increases the mess, and usually still leaves a substantial amount of foam beyond the desired amount.

Even if the beverage is poured in the glass before adding the frozen treat, the beverage can foam up, and it may splash when poured and cause a mess. The amount of foam may sometimes diminish somewhat if the beverage bottle or can is cooled before the beverage comes in contact with the frozen treat. However, foaming still occurs even if the beverage is cooled, and it is often desired to make a float using a beverage when there has been no time or opportunity to cool the beverage can or bottle in advance of making the float.

It is thus desirable to have a method of making floats that reduces the amount of foam in the float produced by the carbonated beverage with a minimum of effort and mess.

SUMMARY

The present disclosure is directed to a method of preparing floats such as root beer floats, and an apparatus useful in making root beer and other float-type beverages. Disclosed is a strainer comprising a generally circular bottom section sized for insertion into a single-serving beverage container; a side section projecting substantially vertically from the bottom section and sized for insertion into a single-serving beverage container; at least one of the bottom and side sections being liquid permeable; the bottom section and side section separately or collectively capable of retaining ice pieces when the strainer is lifted from a single-serving beverage container.

Also disclosed is a method for removing at least some ice pieces from a container capable of holding a liquid comprising: placing a strainer capable of retaining ice pieces in a container capable of holding a liquid; adding ice to the container; placing a liquid in the container; and removing the strainer from the container. The remaining liquid can then be combined with a cold treat with significantly reduced foaming of the beverage. In one embodiment of the method, a liquid-permeable strainer capable of retaining a plurality of ice pieces is placed in a container capable of holding a carbonated beverage; a plurality of ice pieces are added to the container; a carbonated beverage is placed in the container such that the carbonated beverage is cooled; and the strainer is removed from the container. Ice cream or other frozen treats may be added to the beverage with significantly reduced foaming. Alternatively, the strainer device may be agitated in the container holding a beverage to release the carbonation prior to placing the beverage together with the cold treat.

The above summary is not intended to describe each disclosed embodiment or every implementation. The figures and the detailed description that follow more particularly exemplify these embodiments.

DETAILED DESCRIPTION

The present disclosure is directed to a method of preparing floats such as root beer floats, and an apparatus useful in making root beer and other float-type beverages.

As used herein, "carbonated" beverages generally refers to beverages that are capable of generating bubbles or foam when poured, whether or not this capability arose through a process that would be considered by one of skill in the art to be a "carbonation" process or not.

Figure 1:
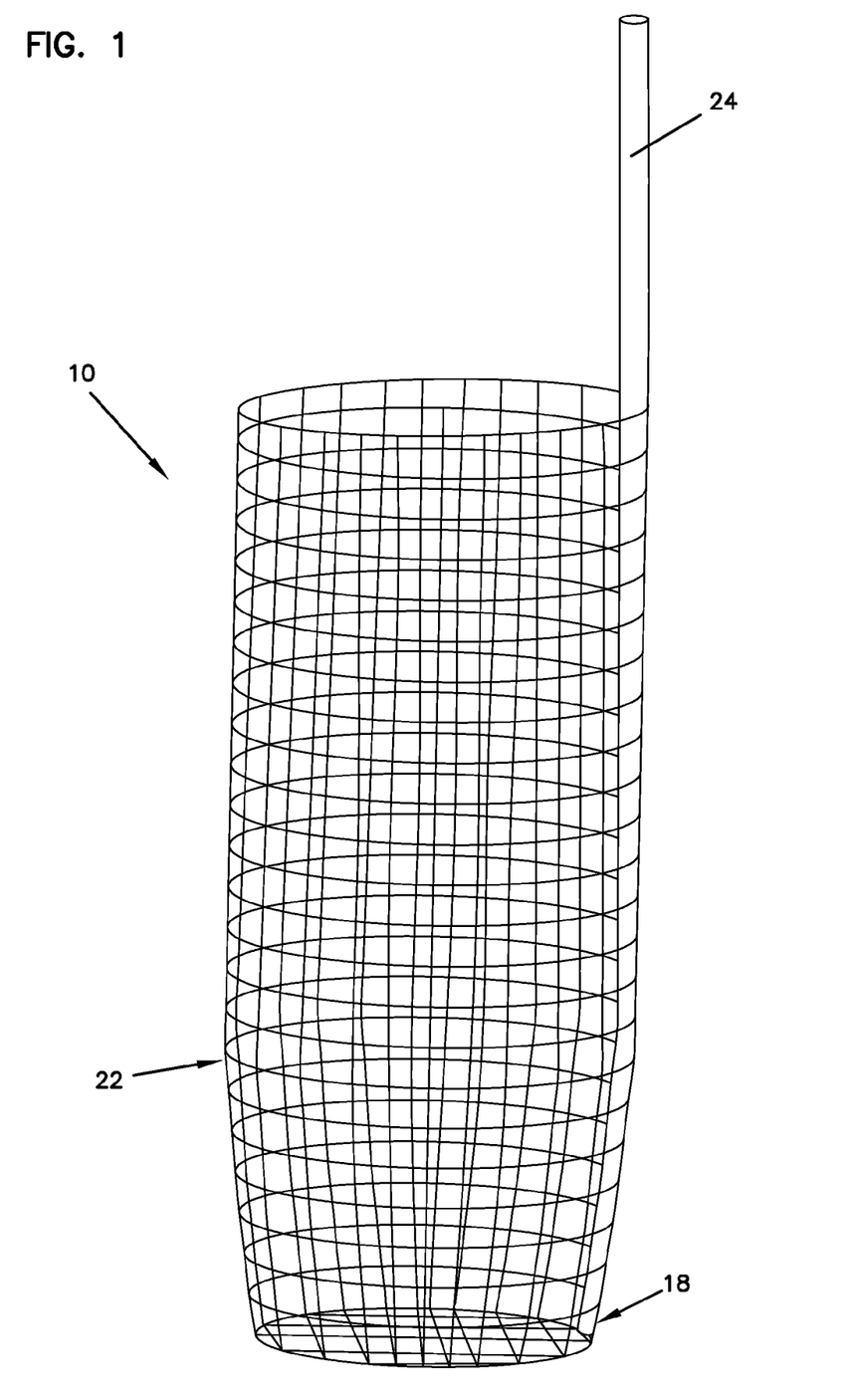
FIG. 1 shows an example embodiment of a strainer.

One example embodiment of a strainer 10 is shown in FIG. 1. Strainer 10 as shown has a generally circular bottom section 18 connected to a generally cylindrical side section 22. The strainer allows liquid to pass through it upon removal from glass, but has apertures or another straining structure to either retain foamy residue of carbonated beverage or to reduce the foamy residue by contacting bubble-like surfaces.

An optional gripping member 24 is connected to side section 22 and provides a surface to grip by hand or otherwise for lifting or moving the strainer. This gripping member 24 may project from side of strainer 10 so that the member 24 may rest on the top edge of a beverage container in which the strainer is placed for easier removal, especially when the strainer is shorter than the beverage container.

The strainer as shown is shaped generally cylindrically to fit within a drinking glass or other beverage container. The strainer need not be generally cylindrical, but can be shaped such that its width is generally narrower than the interior diameter of the beverage container with which it will be used.

Figure 2:
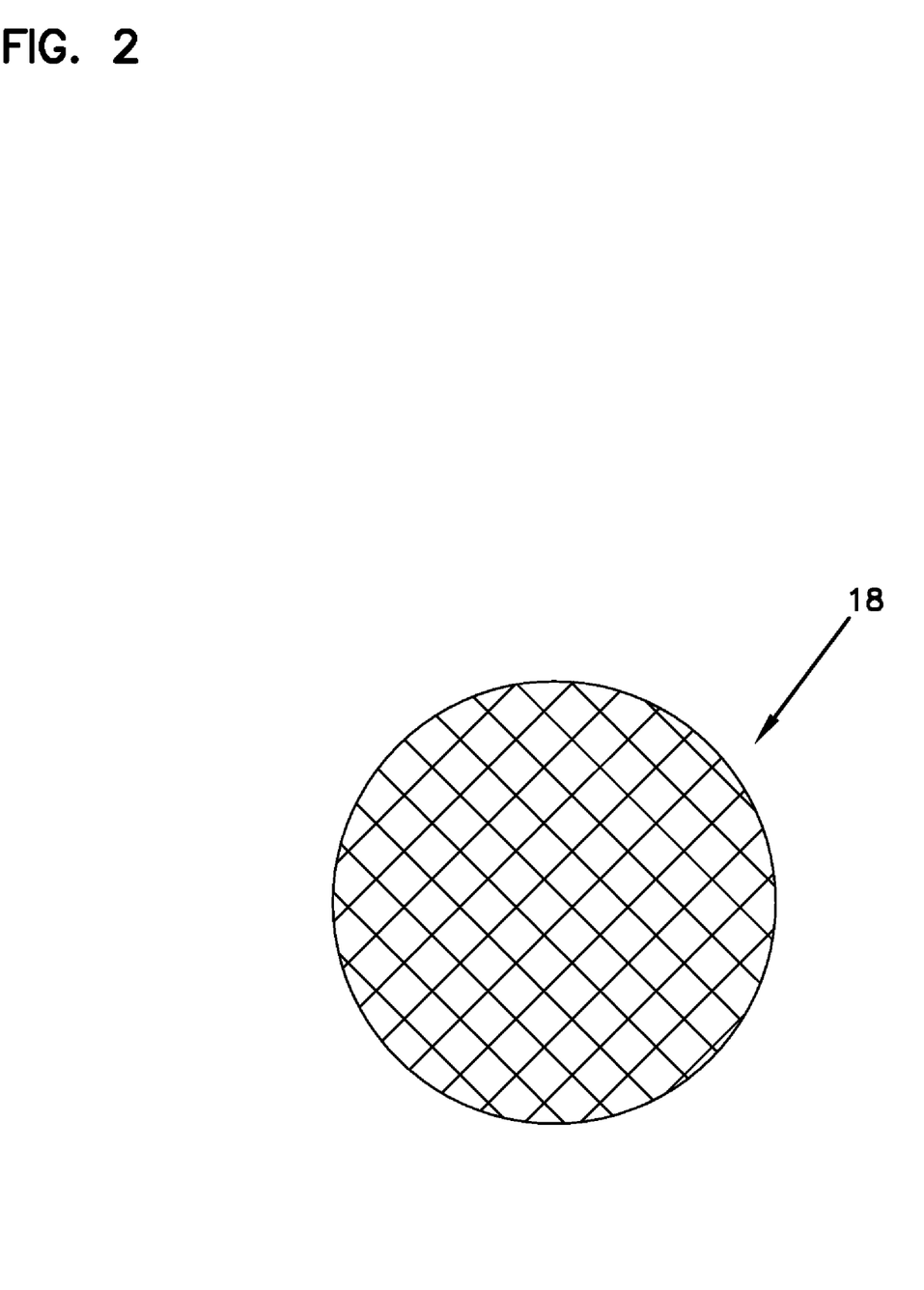
FIG. 2 shows a bottom section of the strainer of FIG. 1.

FIG. 2 shows a bottom view of strainer 10 with bottom section 18. The bottom section as shown is generally circular, but could be oval, square, or some other shape.

As shown in FIGS. 1 and 2, the strainer is liquid permeable through use of a wire mesh construction. Alternatively, either or both of the bottom or side sections of the strainer may use an alternative liquid permeable construction such as that shown in FIG. 3.

Figure 3:
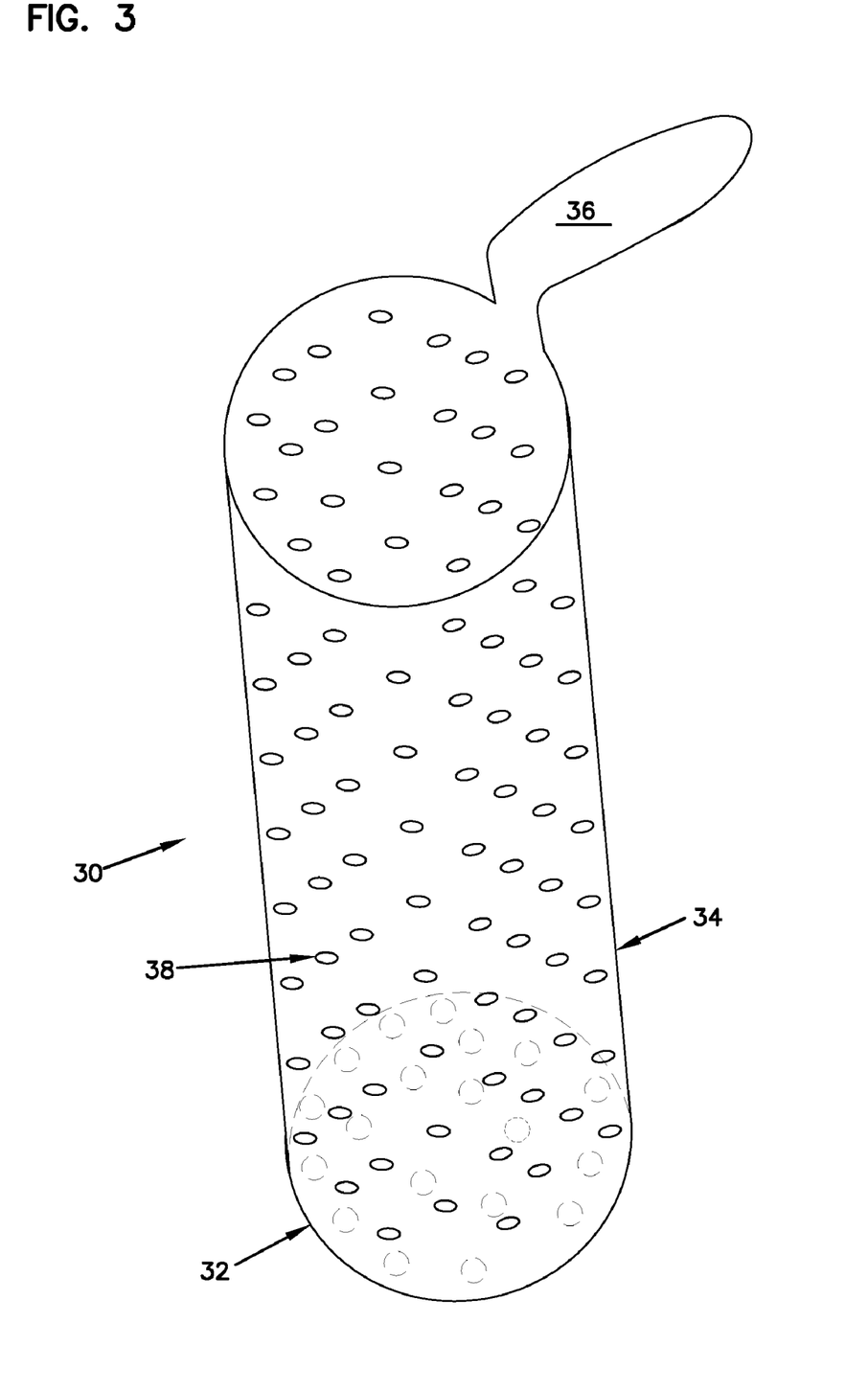
FIG. 3 shows another example embodiment of a strainer.

FIG. 3 shows an example strainer 30 with a bottom section 32, side section 34 and optional grippable member 36 comprising a material having holes such as hole 38. This construction may utilize an integrally formed plastic material. Alternatively, a combination of materials may be used.

Either the bottom or side sections may in whole or in part lack permeability, although one of the two sections may have some capability of allowing liquid to exit the strainer when it is removed from a beverage container while the strainer remains capable of retaining ice pieces.

Figure 4:
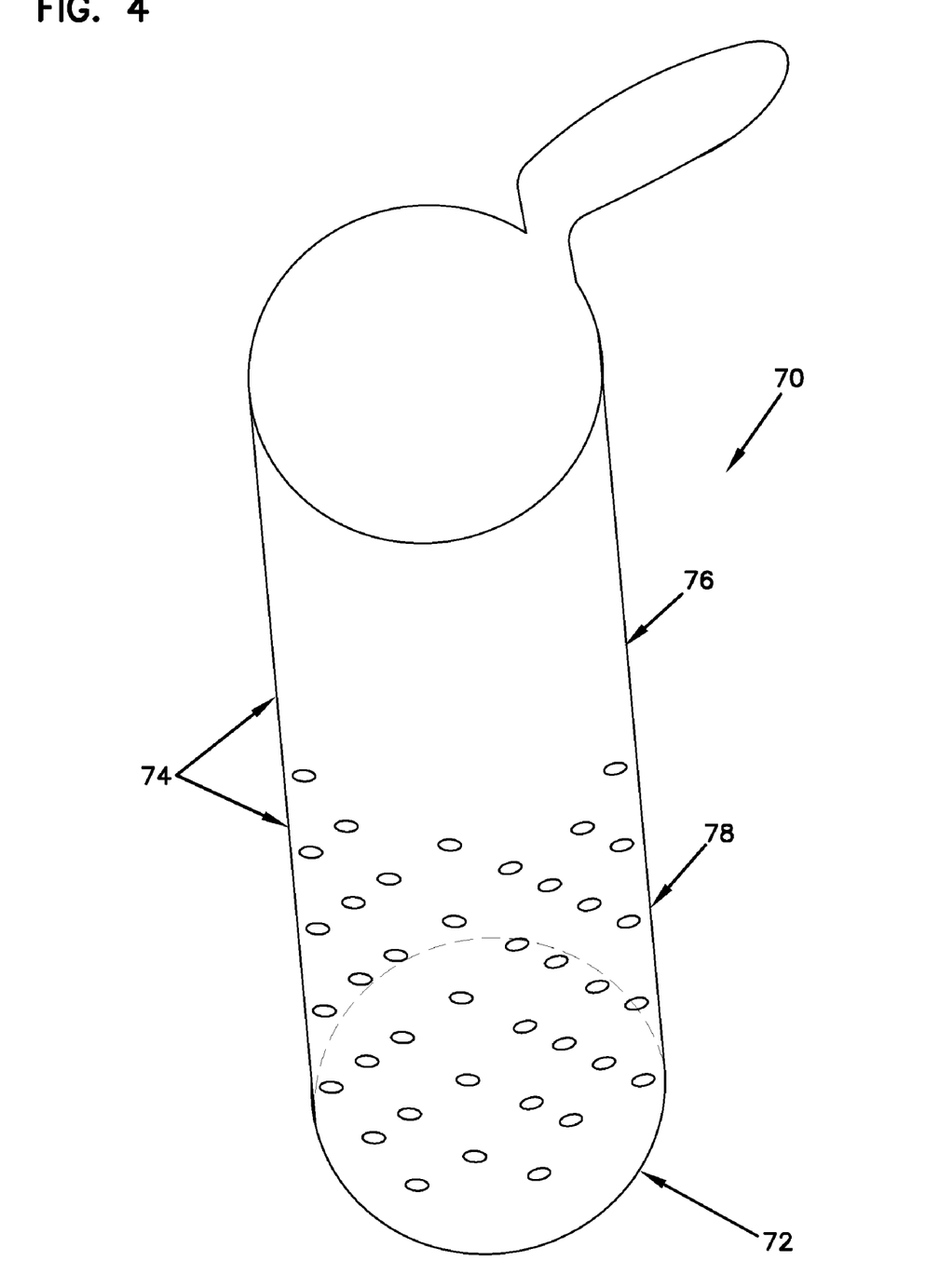
FIG. 4 shows another example embodiment of a strainer.

For example, FIG. 4 shows another embodiment of a strainer 70 wherein bottom section 72 and an upper section 76 of side section 74 are not permeable, but the remainder 78 of side section 74 is permeable to liquid.

Figure 5:
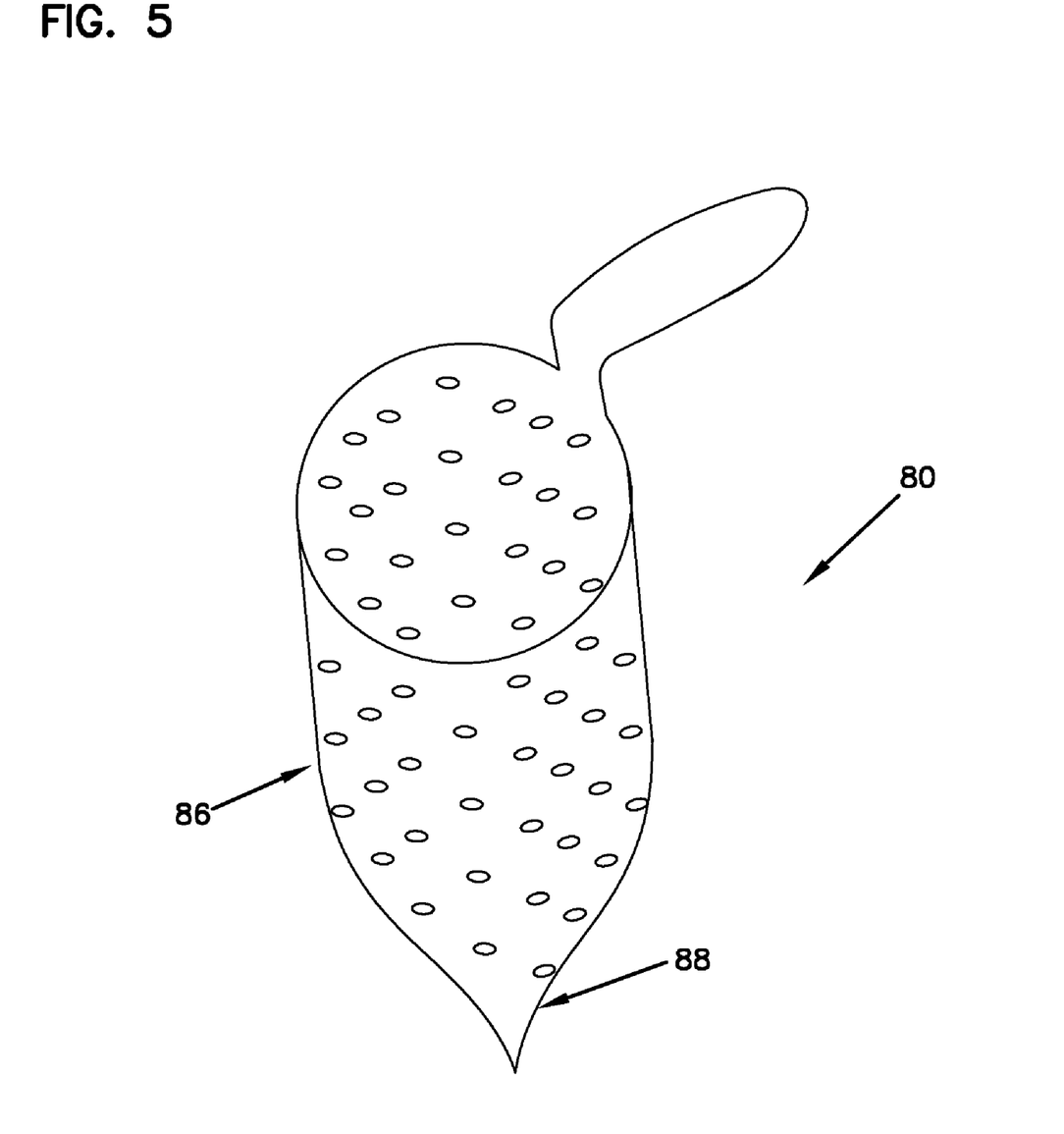
FIG. 5 shows another example embodiment of a strainer.

As another alternative, the strainer may have a construction as shown in FIG. 5. FIG. 5 shows a strainer 80 with side section 86 shaped so that it also provides the bottom section through a tapering section 88 at the bottom. The tapering section may enclose the bottom, or generally narrow at the bottom to leave an opening. In the example shown, tapering section 88 of strainer 80 forms an inverted cone shape.

An example method of using the strainer is now described. As shown by flow chart 100 in FIG. 6, the strainer is placed in a beverage container such as a glass in step 102. At step 106, ice cubes or other ice pieces are placed in the strainer. When the strainer is in the glass and has ice (or some other beverage cooling material, although herein such materials are called "ice" to include both ice and such other materials, such as cooling plastic cubes) in it, it may have the appearance of FIG. 7.

Figure 7:
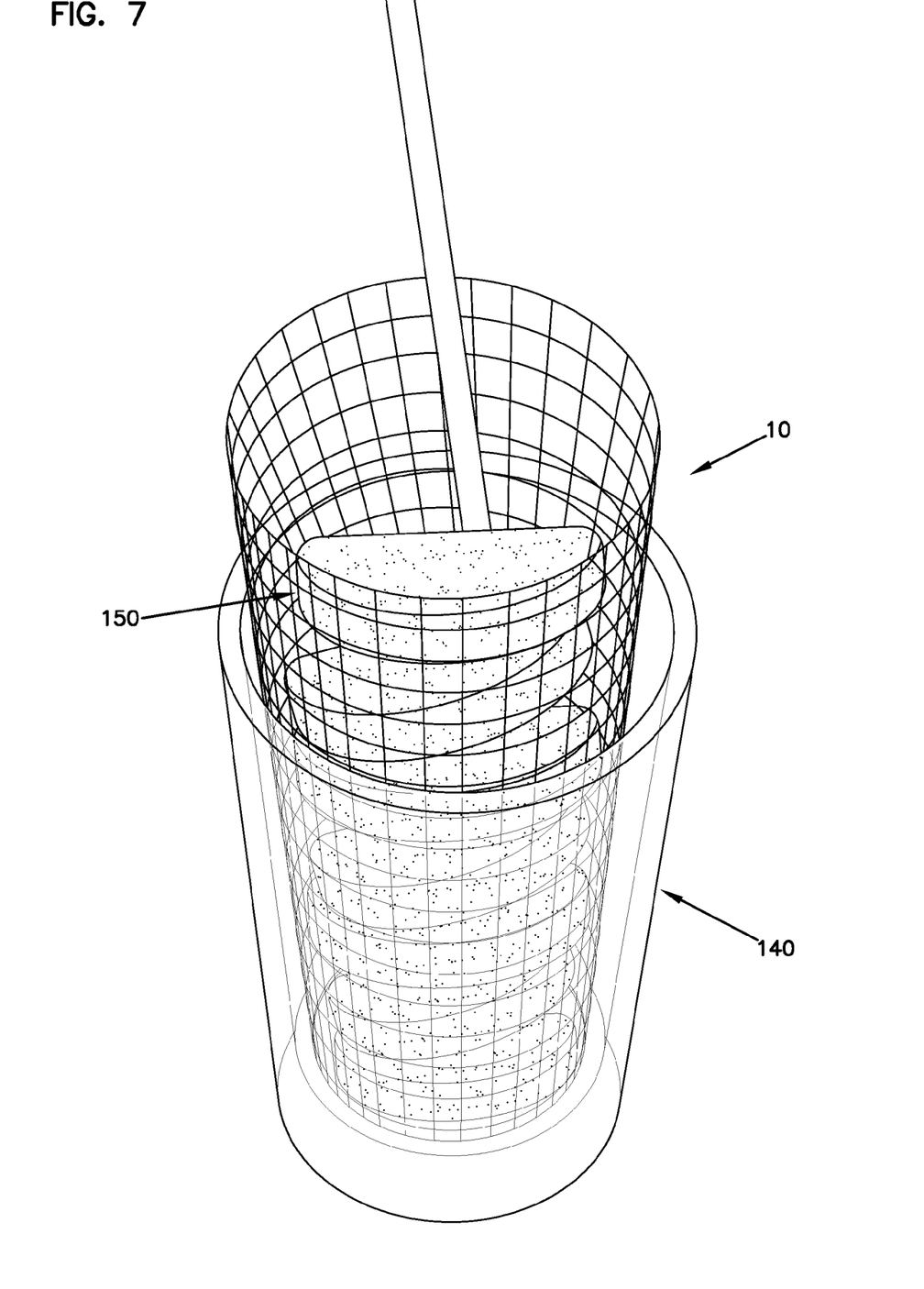
FIG. 7 shows the strainer of FIG. 1 having ice cubes therein and positioned in an example glass.

FIG. 7 shows a container such as glass 140, holding strainer 10 having ice 150 inside. The order of steps may vary, but generally it is preferred to place the strainer in the container before placing the ice in the strainer.

Figure 6:
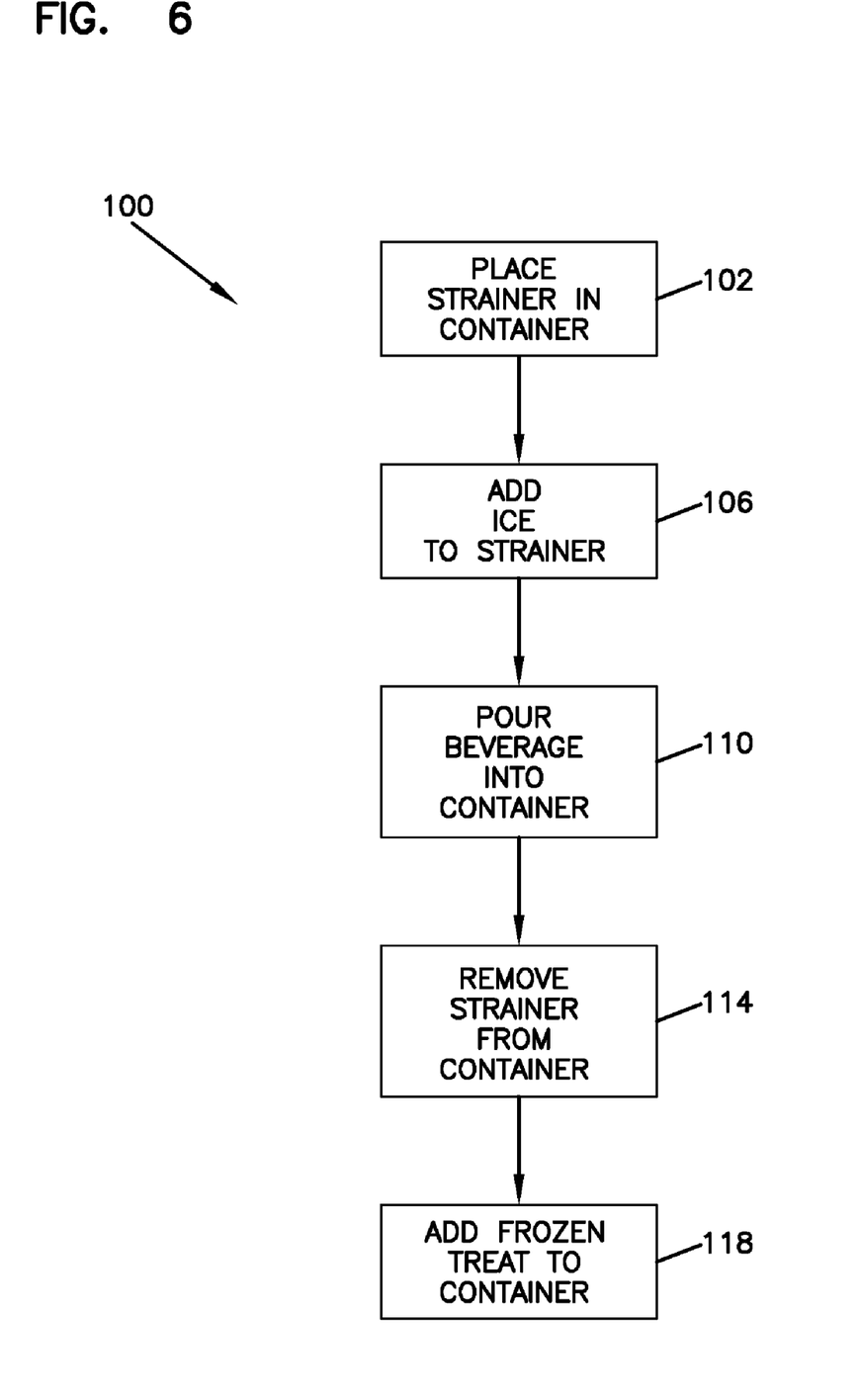
FIG. 6 shows an example method for using a strainer.

With the ice in the strainer and container, the beverage is poured into the glass as indicated at step 110 of FIG. 6. Again, the beverage may be poured into the glass before the strainer with ice is added, but generally it is preferred to perform the steps in the order depicted in FIG. 6.

Figure 8:
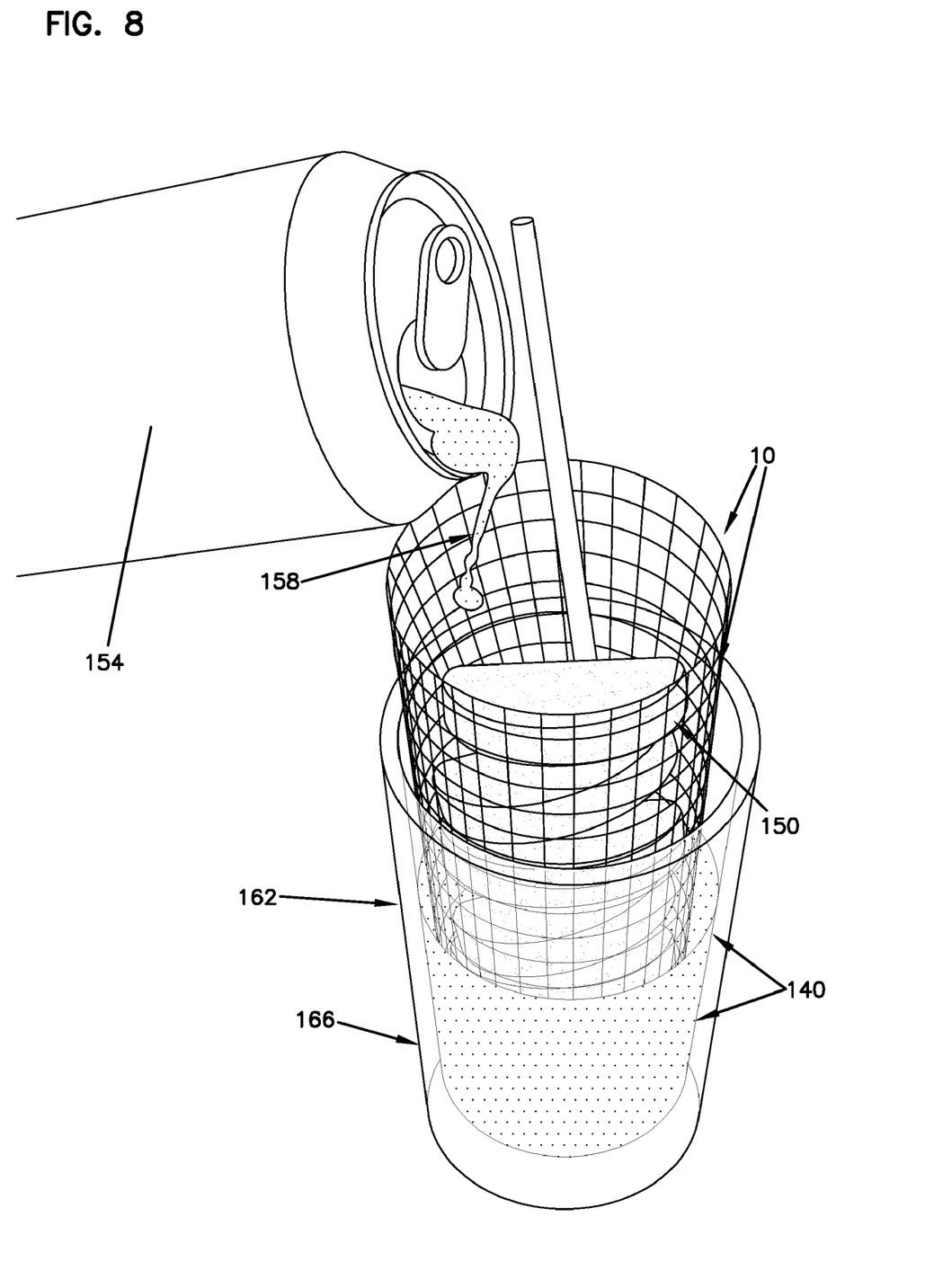
FIG. 8 shows the strainer and glass of FIG. 7 with an example beverage being poured into the glass.

FIG. 8 shows one example of step 110. A can 154 having a beverage 158 such as root beer or another carbonated beverage is poured into glass 140. Foam 162 forms when the beverage 158 is poured into glass 140 having strainer 10 and retaining ice 150. Liquid 166 is also retained in glass 140.

In the example method shown, the liquid poured into the glass is a carbonated beverage such as root beer, a cola beverage, or a flavored soda such as orange or lemon-lime flavored soda. When the carbonated beverage contacts the ice, bubbles and/or foam (e.g., foam 162) may be created, and the beverage will probably be cooled (depending in part on its temperature when poured). Typically, the bubbling or foam production will slow and bubbles or foam disappear within a few seconds or moments.

Once some amount of time has passed after the beverage and ice contact each other, the strainer is lifted out of the container as indicated at step 114 of FIG. 6.

Figure 9:
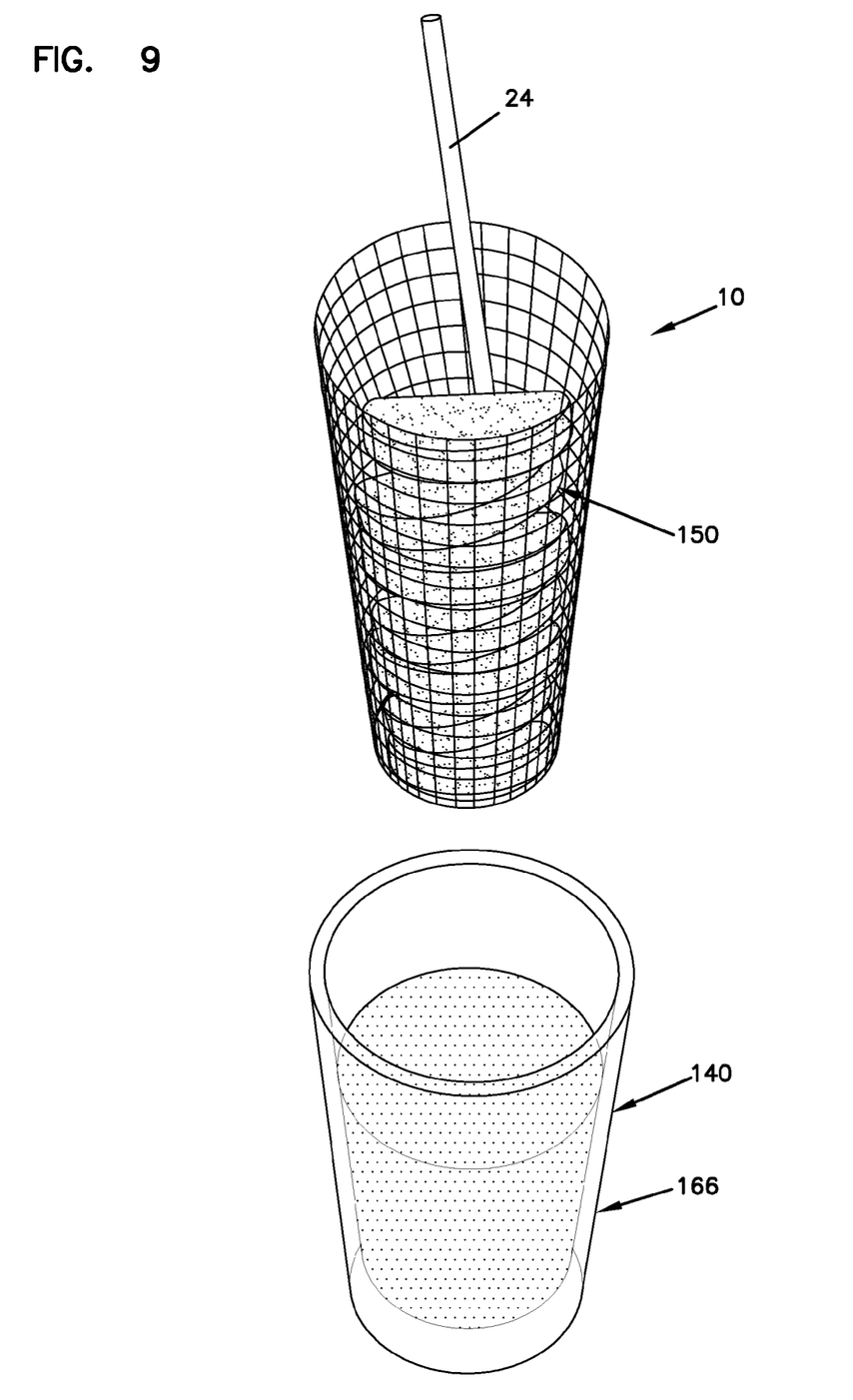
FIG. 9 shows the strainer and glass of FIG. 8 with the strainer being partially removed from the glass.

As shown in FIG. 9, the optional gripping member 24 may (or may not) be used for this step. When the strainer 10 is removed from the glass 140, the liquid 166 generally remains in the container, while the portions of the ice 150 that do not melt or slip through the strainer will be removed from the container along with the strainer. Depending on such factors as the size of the ice pieces and the amount of time that the ice sits in the container, the ice may be a significant portion of the ice added to the strainer originally, or not.

The strainer may be removed to another location, such as a sink or bowl, where the ice may be dumped out, allowed to melt, or retained for possible re-use.

Figure 10:
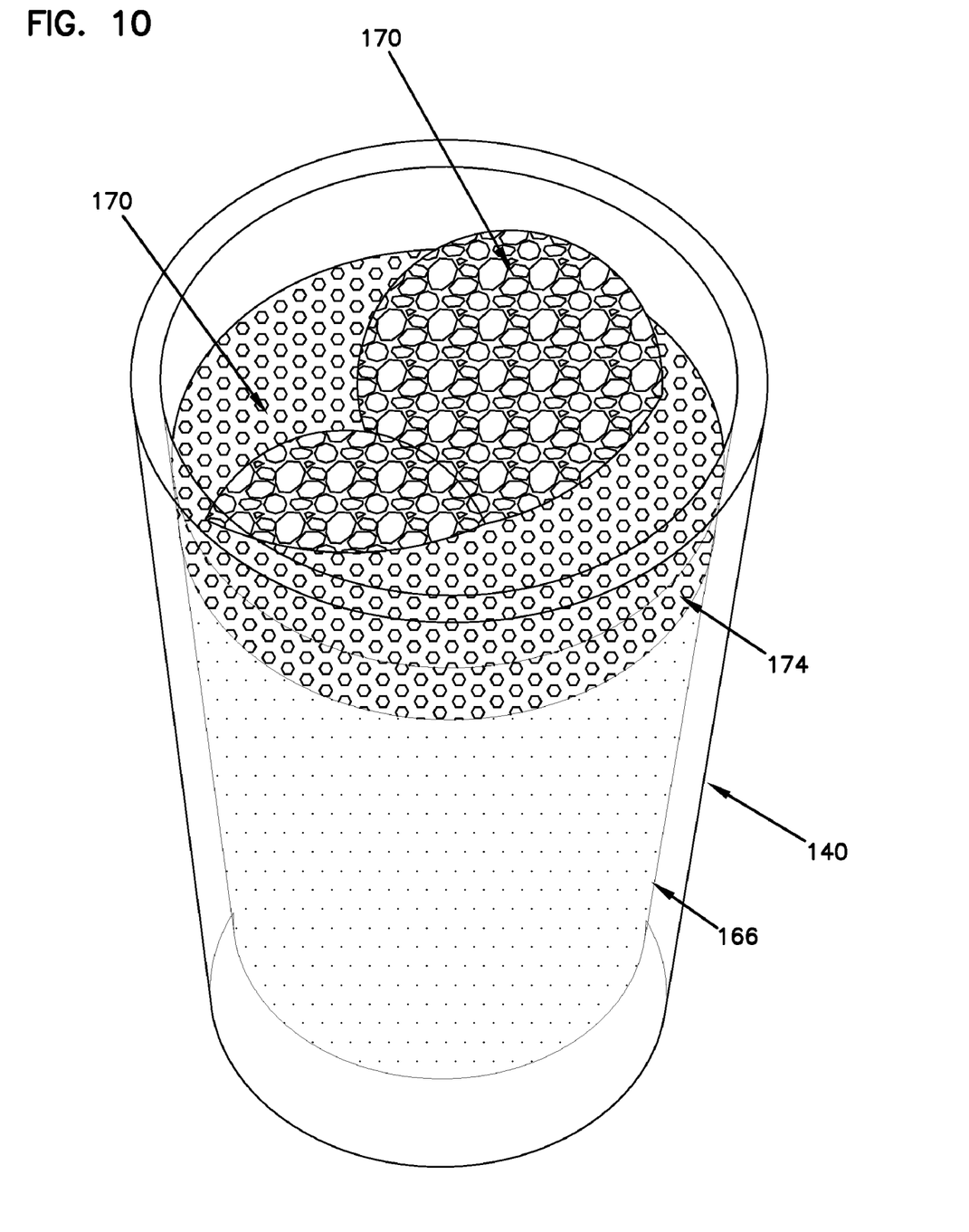
FIG. 10 shows the glass of FIG. 9 with the strainer completely removed therefrom.

Once the strainer is removed, ice cream or other suitable cold food such as sherbet, ice milk, frozen yogurt, or gelato, is added to the container to make a float. This step is described at step 118 of FIG. 6 and in FIG. 10. Because the liquid 166 in the glass 140 has already had an opportunity to bubble or create foam, i.e. has "lost its fizz" at least in part, the additional of the cold food 170 will typically generate substantially less foaming or bubbling than would be generated had the beverage been poured into the container having the cold food inside. This allows the container to retain a greater amount of the beverage and cold food without having as much foam and with the combination less likely to overflow the container.

Alternatively, ice generally cools the beverage directly, but may also cool the strainer or the glass, for example when the strainer is made of metal. In that situation, the ice may be added to the strainer to make the strainer cold, and then removed before the beverage is poured in. The strainer may also be made of a material that would allow it to be placed in a freezer to be cooled down, then inserted into the beverage container and used to cool the beverage without adding ice at all.

Often, once the cold food is added, there may be room in the container to pour more beverage in. An optional additional step includes adding more of beverage, such as the carbonated beverage originally poured into the container. Even though the added carbonated beverage may retain significant "fizz" or carbonation when poured, and create some foam such as foam 174 in FIG. 10, generally adding a beverage to the container already having the cold food and some beverage in the glass will generate less foaming or bubbling than had the above-described process not been followed, and excess foaming and spillage will this still be avoided.

By using the strainer structure described herein, with the various methods described or otherwise, root beer floats, orange floats, and other drinks incorporating carbonated beverages and cold foods can be enjoyed with more of the beverage and food in the container, and less foam, bubbles, and mess.

In example embodiments, the generally cylindrical shape for the strainer also provides the advantage of fitting easily in the proper location for receiving ice under automatic ice dispensers as are found, for example, on the front of many refrigerators. The strainer can, but not necessarily, have a rigid construction that facilitates activation of a lever that typically initiates dispensing ice from such ice dispensers.

The present disclosure should not be considered limited to the particular examples described above, but rather should be understood to cover all aspects as fairly set out in the attached claims. Various modifications, equivalent processes, as well as numerous structures may be applicable will be readily apparent to those of skill in the art upon review of the instant specification.

What is claimed is:

1. A method of minimizing foam in combining root beer and ice cream in a beverage container, the method comprising:

placing a liquid-permeable strainer in a beverage container capable of holding root beer;

thereafter, adding ice to the beverage container where at least some of the ice is retained in the strainer placed in the beverage container;

thereafter, placing the root beer in the beverage container such that the root beer comes in contact with the ice retained in the strainer to reduce a temperature of the root beer;

allowing at least a portion of the root beer to foam inside the strainer and the beverage container as at least a portion of the root beer is cooled by the ice in the strainer to thereby minimize foam when ice cream is added to the beverage container;

thereafter, removing the strainer with any of the ice remaining in the strainer from the beverage container; and thereafter, adding the ice cream to the beverage container.

2. The method of claim 1, further comprising adding more root beer to the beverage container after adding the ice cream to the beverage container.

3. The method of claim 1, wherein the ice is added to the beverage container using an automatic ice dispenser.

* * * * *